(12) United States Patent
Hosain

(10) Patent No.: US 10,929,082 B2
(45) Date of Patent: *Feb. 23, 2021

(54) COMMUNICATION BETWEEN DISPLAY AND DEVICE UTILIZING A COMMUNICATION AND DISPLAY PROTOCOL

(71) Applicant: Aeris Communications, Inc., San Jose, CA (US)

(72) Inventor: Syed Zaeem Hosain, San Jose, CA (US)

(73) Assignee: Aeris Communications, Inc., San Jose, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/205,389

(22) Filed: Nov. 30, 2018

(65) Prior Publication Data

US 2019/0102132 A1    Apr. 4, 2019

Related U.S. Application Data

(63) Continuation of application No. 14/748,989, filed on Jun. 24, 2015, now Pat. No. 10,157,030.

(60) Provisional application No. 62/016,573, filed on Jun. 24, 2014.

(51) Int. Cl.
*G06F 3/14* (2006.01)
*G06F 3/02* (2006.01)
*G06F 3/041* (2006.01)

(52) U.S. Cl.
CPC .......... *G06F 3/1423* (2013.01); *G06F 3/0227* (2013.01); *G06F 3/0416* (2013.01); *G06F 3/14* (2013.01); *G09G 2370/02* (2013.01)

(58) Field of Classification Search
CPC .... G06F 3/1423; G06F 3/0227; G06F 3/0416; G06F 3/14; G09G 2370/02
See application file for complete search history.

(56) References Cited

U.S. PATENT DOCUMENTS

| | | | |
|---|---|---|---|
| 7,577,915 | B2 | 8/2009 | Hunter |
| 9,299,194 | B2 | 3/2016 | Border |
| 9,323,496 | B2 | 4/2016 | Nosaka |
| 10,157,030 | B2 * | 12/2018 | Hosain ................. G06F 3/0227 |
| 2003/0212811 | A1 | 11/2003 | Thornton |
| 2005/0267972 | A1 | 12/2005 | Costa-Requena et al. |
| 2010/0138780 | A1 | 6/2010 | Marano |
| 2010/0299436 | A1 | 11/2010 | Khalid |
| 2012/0287022 | A1 | 11/2012 | Queen |
| 2014/0104141 | A1 | 4/2014 | Hwang |

(Continued)

OTHER PUBLICATIONS

International Search Report and Written Opinion from International Application No. PCT/US15/37526 dated Oct. 5, 2015.

*Primary Examiner* — Kenneth B Lee, Jr.
(74) *Attorney, Agent, or Firm* — Brundidge & Stanger, P.C.

(57) ABSTRACT

A system is disclosed. The system includes one or more devices, wherein the one or more devices include communication functions and at least one application contained therein. The system also includes one or more displays. The one or more displays do not have any application programs contained therein. The one or more displays and the one or more devices communicate via a communication and display protocol.

11 Claims, 3 Drawing Sheets

(56) References Cited

U.S. PATENT DOCUMENTS

2014/0168100 A1\* 6/2014 Argiro ................. G06F 3/0416
                                                          345/173
2015/0009096 A1  1/2015 Lee \* cited by examiner

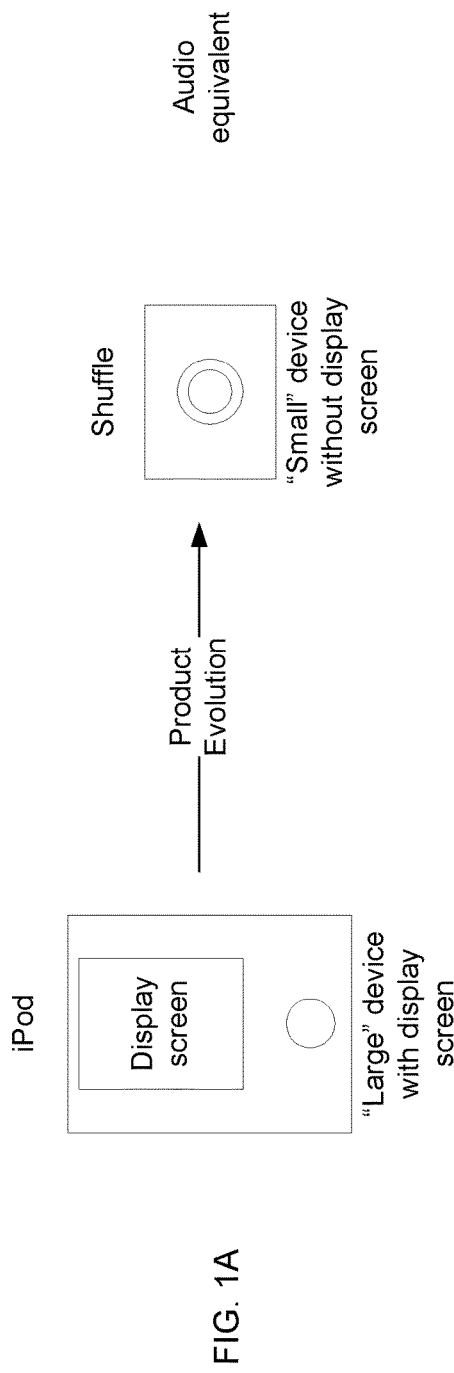
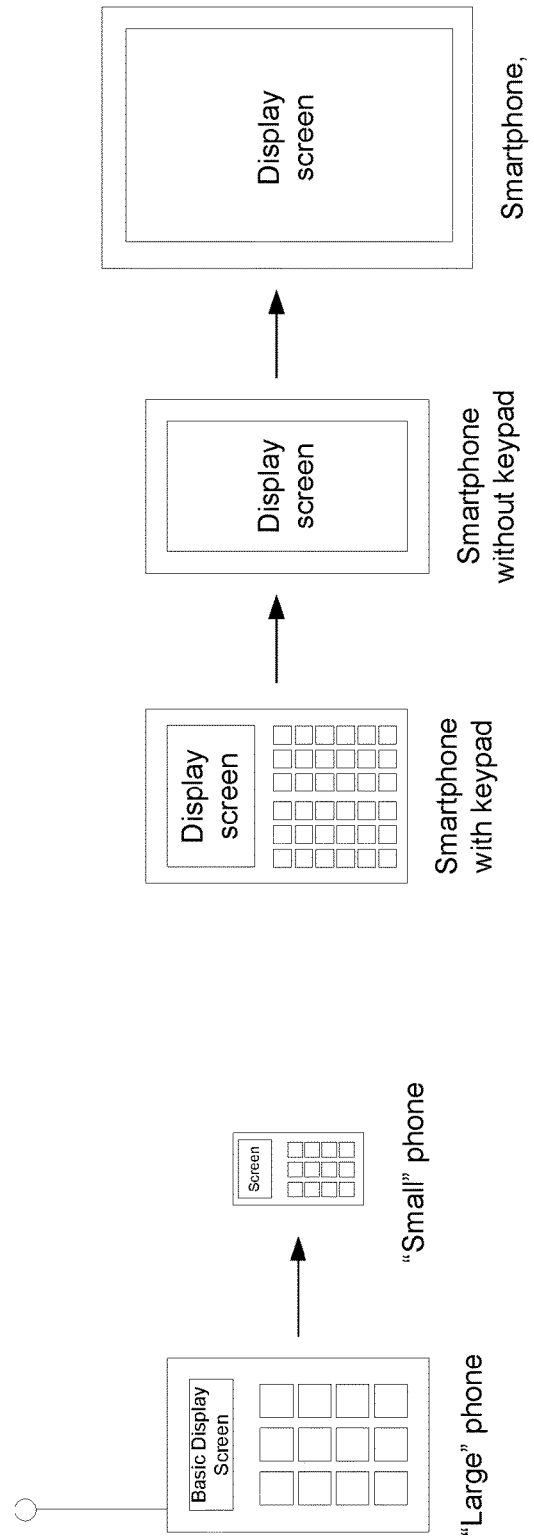
FIG. 1A
FIG. 1B
FIG. 1C

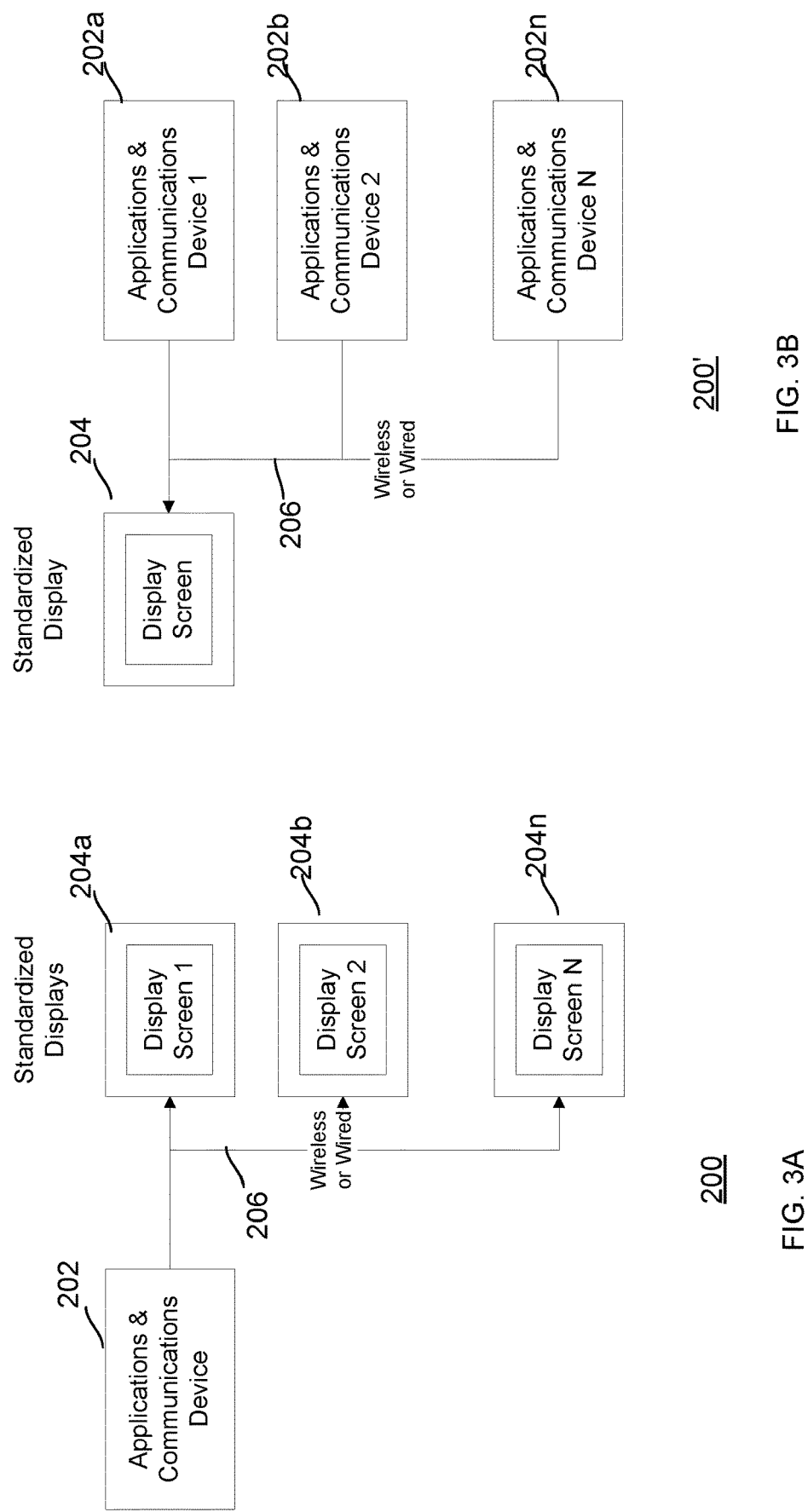

COMMUNICATION BETWEEN DISPLAY AND DEVICE UTILIZING A COMMUNICATION AND DISPLAY PROTOCOL

CROSS-REFERENCE TO RELATED APPLICATION

This application is a Continuation of U.S. application Ser. No. 14/748,989, filed Jun. 24, 2015; which claims benefit under 35 USC 119(e) of U.S. Provisional Patent Application No. 62/016,573, filed on Jun. 24, 2014, entitled "HUMAN VISUAL INTERFACE SEPARATION FROM COMMUNICATION DEVICE," all of which are incorporated herein by reference in their entirety.

FIELD OF THE INVENTION

The present invention relates generally to the communication systems and more particularly to the communication of graphical data of between one or more smart devices to one or more displays.

BACKGROUND

Portable device have evolved over time in a variety of environments. For example, early audio devices such as MP3 players were large devices that included a display screen (IPod) that have evolved into a much smaller device without a display screen (Shuffle) as shown in FIG. 1A Similarly, initially cell phones were very large and heavy devices with a display and a physical keypad to smaller devices with smaller screens and in some cases and small keypads as shown in FIG. 1B. Therefore the devices became easier to use for their intended purpose.

However, with the advent of smart devices, such as smartphones, tablets, phablets, portable computers and other portable devices the devices have become larger. The smart devices have evolved from the device including a physical keypad and a small display to a device without a physical keypad with larger and larger screens as depicted in FIG. 1C.

Hence, to use these devices for their intended purpose (calling and data) becomes more difficult due to the increase in size of the display. In addition, typically as these devices become larger they use more power which limits the amount of time one can use the device between charging. Furthermore because the device is larger due to the increased size of the display, the device is cumbersome when utilized for example as a phone. Therefore additional accessories are typically used such as a wireless headset or other devices that are coupled to the smart device.

Accordingly, what is needed is a system to address the above identified issues. The present invention addresses such a need.

SUMMARY

A system is disclosed. The system includes one or more devices, wherein the one or more devices include communication functions and at least one application contained therein. The system also includes one or more displays. The one or more displays do not have any application programs contained therein. The one or more displays and the one or more devices communicate via a communication and display protocol.

BRIEF DESCRIPTION OF THE DRAWINGS

FIGS. 1A-1C illustrate the evolution of electronic devices.

FIG. 3A is a block diagram of a first embodiment of a communication system in accordance with the present invention.

FIG. 3B is a block diagram of a second embodiment of a communication system in accordance with the present invention.

DETAILED DESCRIPTION

Figure 2:
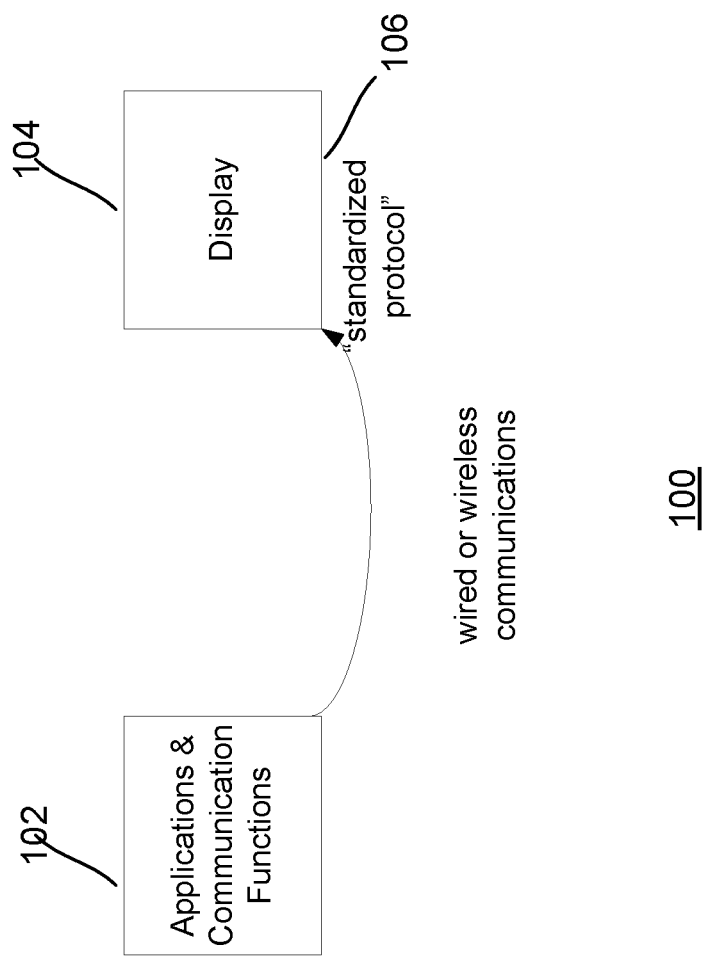
FIG. 2 is a simple block diagram of a communication system in accordance with the present invention.

The present invention relates generally to the communication systems and more particularly to the communication of graphical data of between one or more communication devices to one or more displays. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

FIG. 2 is a simple block diagram of a communication system 100 in accordance with the present invention. The system 100 includes at least one device 102 that includes at least communication functions and at least one software application that is utilized with the communication functions and at least one display 104. The at least one display 104 is a "dumb" display, that is, there are no applications resident on the display. The at least one display 104 communicates with the at least one device 102 either through a wired connection or wirelessly via a communication and display protocol 106.

A key feature of the present invention is that in a device such as smartphone the processing features (calling, applications, etc.) are separated from the visual features of the phone. In so doing, the part of the device that houses the processing features can be miniaturized while the part of the device that houses the visual features can be adapted to various environments.

The communication functions of the at least one device 102 can include cellular calls and data if the at least one device 102 is a smart phone, phablet, tablet or the like. In some embodiments the at least one device 102 would include any or any combination of a keypad, display or neither a keypad or display. The at least one device 102 could be activated by any of, including but not limited to, a keypad, a touch pad, voice recognition, gestures or any combination thereof.

The data transmitted by communication functions can be provided by sensors from various locations, such as sensors in skin patches, sensors located in one or more buildings, sensors within one or more homes, sensors within one or more offices, sensors within one or more vehicles or any other places that data can be gathered and displayed. The communication functions can include devices in the machine to machine (M2M) environment or the Internet of Things (IoT) that may provide data that can be displayed. The types of applications that this can be used in include, but are not limited to, medical monitors, telematics, automation environment and various sensors that provide data.

The sensors include, but are not limited to, any or any combination of gyroscopes, accelerometers, torque sensors, weight sensors, pressure sensors, magnetometers, temperature sensors, light sensor, cameras and microphones, GPS, wireless detection, altitude sensors, blood pressure, heart rate sensors, biometric sensors, radio frequency identification (RFID), near field communication (NFC), mobile communication, Wi-Fi, strain gauges, fingerprint sensors, smell sensors gas sensors, chemical sensors, color sensors, sound sensors, acoustic sensors, ultraviolet sensors, electric field sensors, magnetic field sensors, gravity sensors, wind speed sensors, wind direction sensors, compass sensors, geo-locator sensor, polarized light sensors, infrared emitter sensors.

In an embodiment, the communication and display protocol 106 between at least one display 104 and the at least one device 102 can be wired or wireless that could be standardized. In the embodiment, the protocol 106 may be utilized with networking technologies including, but not limited to, Wi-Fi, ZigBee, Bluetooth, Bluetooth Low Energy (BLE), and other wireless communication protocols.

In the embodiment, the display can also be in a variety of forms. The display 104 can be large, for example the display can be a high definition television (HDTV) or projector that can be viewed by a variety of users or it can be embedded in something as small as a contact lens an embedded in the human eye on the retina. The display 104 could be utilized in eye glasses such as Google Glass or other wearable technologies.

Systems in accordance with the present invention can be utilized in a variety of environments. To describe these environments in more detail refer now to following discussion in conjunction with the accompanying Figures.

FIG. 3A is a block diagram of a first embodiment of an environment 200 utilizing a communication system in accordance with the present invention. In the first embodiment, there is one device 202 coupled to a plurality of displays 204a-204n via a communication and display protocol 206. Accordingly in this embodiment, the displays 204a-204n may be in various locations for multiple individuals to view data provided by the device 202.

FIG. 3B is a block diagram of a second embodiment of a second environment 200' utilizing a communication system in accordance with the present invention. In the second embodiment, there is one display 204 coupled to a plurality of devices 202a-202n via a communication and display protocol 206. Accordingly in various embodiments, the devices 202a-202n may be in communication with the display 204 and the data from one or more of the devices 202a-202n can be viewed individually or simultaneously dependent upon the need.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A system comprising:
   one or more devices providing processing features; wherein the one or more devices includes communication functions and at least one application contained therein; and
   one or more displays providing visual features, wherein the one or more displays do not have any application programs contained therein;
   wherein the processing features and the visual features of the one or more devices are separated from each other by utilizing the one or more displays, and
   wherein the one or more displays and the one or more devices communicate wirelessly via a communication and display protocol.

2. The system of claim 1, wherein the one or more devices comprises any of: a smartphone, tablet, phablet, portable computer, a machine to machine (M2M) device, an Internet of Things (IoT) device and a portable device.

3. The system of claim 1, wherein at least one of the one or more devices includes a display.

4. The system of claim 1, wherein at least one of the one or more devices does not include a display.

5. The system of claim 1, wherein at least one of the one or more devices does not include a keypad.

6. The system of claim 1, wherein at least one of the one or more devices includes a keypad.

7. The system of claim 1, wherein at least one of the one or more displays comprises a touch screen.

8. The system of claim 1, wherein at least one of the one or more displays comprises eyeglasses.

9. The system of claim 1, wherein the one or more devices and one or more displays communicate wirelessly.

10. The system of claim 9, wherein the one or more devices and the one or more displays communicate utilizing any of Wi-Fi, Bluetooth, Bluetooth Low Energy (BLE), ZigBee and other wireless communication protocols.

11. The system of claim 1, wherein the communication of the one or more devices and the one or more displays comprise any of one display communicating with a plurality of devices and one device communicating with a plurality of displays.

* * * * *